(12) United States Patent
Zhang et al.

(10) Patent No.: US 12,373,627 B2
(45) Date of Patent: Jul. 29, 2025

(54) SYSTEM AND METHOD FOR GENERATING A FLOORPLAN FOR A DIGITAL CIRCUIT USING REINFORCEMENT LEARNING

(71) Applicants: Zhanguang Zhang, Montreal (CA); Mohammad Amini, Montreal (CA); Yingxue Zhang, Montreal (CA); Wulong Liu, Montreal (CA)

(72) Inventors: Zhanguang Zhang, Montreal (CA); Mohammad Amini, Montreal (CA); Yingxue Zhang, Montreal (CA); Wulong Liu, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 579 days.

(21) Appl. No.: 17/866,270

(22) Filed: Jul. 15, 2022

(65) Prior Publication Data

US 2023/0252215 A1 Aug. 10, 2023

Related U.S. Application Data

(60) Provisional application No. 63/308,909, filed on Feb. 10, 2022.

(51) Int. Cl.
*G06F 30/392* (2020.01)
*G06F 30/20* (2020.01)
(Continued)

(52) U.S. Cl.
CPC .......... *G06F 30/392* (2020.01); *G06F 30/327* (2020.01); *G06F 30/20* (2020.01); *G06F 30/373* (2020.01); *G06F 2119/02* (2020.01)

(58) Field of Classification Search
CPC .... G06F 30/392; G06F 30/327; G06F 30/373; G06F 30/20; G06F 2119/02
(Continued)

(56) References Cited

U.S. PATENT DOCUMENTS 10,817,294 B2 * 10/2020 Fong .................. G06F 9/3009
11,157,246 B2 * 10/2021 Zhang .................. G06N 3/08
(Continued)

FOREIGN PATENT DOCUMENTS

CN  103403719 A  11/2013
CN  113261003 A  8/2021

OTHER PUBLICATIONS

Aravindaraj et al., "A Modified SA Algorithm for VLSI floorplan", Internal Jouranl of Scientific and Research Publications, vol. 9, Issue 9, Sep. 2019, pp. 286-289. (Year: 2019).*
(Continued)

*Primary Examiner* — Phallaka Kik (57) ABSTRACT

Methods and systems for generating a floorplan for a circuit are disclosed. A netlist graph of the circuit and block features associated with blocks of the circuit are obtained. A reinforcement learning (RL) agent is used to generate a sequence of corner block list (CBL) actions. Each CBL action is generated by: generating a current state embedding representing a current state of the floorplan; and inputting the current state embedding to a policy network of the RL agent to generate a predicted output vector, which is used to generate the CBL action. After each CBL action is generated, the current CBL representation of the floorplan and the block features are updated to reflect the state of the floorplan after applying the CBL action. The CBL representation is outputted as a final floorplan after all blocks have been placed.

20 Claims, 7 Drawing Sheets

(51) Int. Cl.
    *G06F 30/327*    (2020.01)
    *G06F 30/373*    (2020.01)
    *G06F 119/02*   (2020.01)

(58) Field of Classification Search
    USPC ............................ 716/122, 104, 132; 703/14
    See application file for complete search history.

(56) References Cited

U.S. PATENT DOCUMENTS

| | | | | |
|---|---|---|---|---|
| 2006/0282236 | A1* | 12/2006 | Wistmuller | G06N 3/02 |
| | | | | 703/2 |
| 2012/0159414 | A1* | 6/2012 | Ghanta | G06F 30/3323 |
| | | | | 716/113 |
| 2017/0061063 | A1* | 3/2017 | Gupta | G06F 30/392 |
| 2018/0260221 | A1* | 9/2018 | Fong | G06F 9/3009 |
| 2019/0378037 | A1* | 12/2019 | Kale | G06F 17/17 |
| 2022/0358335 | A1* | 11/2022 | Roeland | H04L 41/5019 |
| 2023/0229845 | A1* | 7/2023 | Ma | G06F 30/398 |
| | | | | 716/112 |

OTHER PUBLICATIONS

Blum et al., "Learning Complexity of Simulated Annealing", Proceedings of the 24th International Conference on Artificial Intelligence and Statistics, 2021, San Diego, California, 10 pages. (Year: 2021).*

Delahaye et al., Simulated annealing: From basics to applications, https://enac.hal.science/hal-01887543v1, Oct. 8, 2018, 44 pages. (Year: 2018).*

Jenifer et al., "Simulated Annealing Algorithm for Modern VLSI Floorplanning Problem", ICTACT Journal on Microelectronics, Apr. 2016, vol. 2, No. 1, 7 pages. (Year: 2016).*

Sing et al., "IC Floorplanning Optimization using Simulated Annealing with Order-based Represntation", I.J. Intelligent Systems and Applications, Apr. 2021, 9 pages. (Year: 2021).*

Lin, J. M., & Chang, Y. W. (2004). "TCG-S: orthogonal coupling of P/sup*/-admissible representations for general floorplans. IEEE Transactions on Computer-Aided Design of Integrated Circuits and Systems", 23(6), 968-980.

Chang, Y. C., Chang, Y. W., Wu, G. M., & Wu, S. W. (2000, June). "B *- trees: A new representation for non-slicing floorplans". In Proceedings of the 37th Annual Design Automation Conference (pp. 458-463).

Murata, H., Fujiyoshi, K., Nakatake, S., & Kajitani, Y. (1996). "VLSI module placement based on rectangle-packing by the sequence-pair". IEEE Transactions on Computer-Aided Design of Integrated Circuits and Systems, 15(12), 1518-1524.

Hong, X., Dong, S., Huang, G., Cai, Y., Cheng, C. K., & Gu, J. (2004). "Corner block list representation and its application to floorplan optimization". IEEE Transactions on Circuits and Systems II: Express Briefs, 51(5), 228-233.

Lin, J. M., & Hung, Z. X. (2011). "UFO: Unified convex optimization algorithms for fixed-outline floorplanning considering pre-placed modules". IEEE Transactions on Computer-Aided Design of Integrated Circuits and Systems, 30(7), 1034-1044.

Lin, J. M., Chen, T. T., Chang, Y. F., Chang, W. Y., Shyu, Y. T., Chang, Y. J., & Lu, J. M. (Nov. 2018). "A fast thermal-aware fixed-outline floorplanning methodology based on analytical models". In 2018 IEEE/ACM International Conference on Computer-Aided Design (ICCAD) (pp. 1-8). IEEE.

He, Z., Ma, Y., Zhang, L., Liao, P., Wong, N., Yu, B., & Wong, M. D. (Oct. 2020). "Learn to floorplan through acquisition of effective local search heuristics". In 2020 IEEE 38th International Conference on Computer Design (ICCD) (pp. 324-331). IEEE.

Xu, Q., Geng, H., Chen, S., Yuan, B., Zhuo, C., Kang, Y., & Wen, X. (2021). "GoodFloorplan: Graph Convolutional Network and Reinforcement Learning Based Floorplanning". IEEE Transactions on Computer-Aided Design of Integrated Circuits and Systems.

Kipf, T. N., & Welling, M. (2016). "Semi-supervised classification with graph convolutional networks". arXiv preprint arXiv:1609.02907.

Babaeizadeh, M., Frosio, I., Tyree, S., Clemons, J., & Kautz, J. (2016). "Reinforcement learning through asynchronous advantage actor-critic on a gpu". arXiv preprint arXiv:1611.06256.

Van Hasselt, H., Guez, A., & Silver, D. (Mar. 2016). "Deep reinforcement learning with double q-learning". In Proceedings of the AAAI conference on artificial intelligence (vol. 30, No. 1).

Mirhoseini, A., Goldie, A., Yazgan, M., Jiang, J. W., Songhori, E., Wang, S., . . . & Dean, J. (2021). "A graph placement methodology for fast chip design". Nature, 594(7862), 207-212.

Knechtel, J., Young, E. F., & Lienig, J. (Jan. 2014). "Structural planning of 3D-IC interconnects by block alignment". In 2014 19th Asia and South Pacific Design Automation Conference (ASP-DAC) (pp. 53-60). IEEE.

Dulac-Arnold, G., Evans, R., van Hasselt, H., Sunehag, P., Lillicrap, T., Hunt, J., . . . & Coppin, B. (2015). "Deep reinforcement learning in large discrete action spaces". arXiv preprint arXiv:1512.07679.

Bai, S., Zhang, F., & Torr, P. H. (2021). "Hypergraph convolution and hypergraph attention". Pattern Recognition, 110, 107637.

\* cited by examiner

SYSTEM AND METHOD FOR GENERATING A FLOORPLAN FOR A DIGITAL CIRCUIT USING REINFORCEMENT LEARNING

CROSS-REFERENCE TO RELATED APPLICATIONS

The present disclosure claims priority from U.S. provisional patent application No. 63/308,909, filed Feb. 10, 2022, entitled "SYSTEM AND METHOD FOR GENERATING A FLOORPLAN FOR A DIGITAL CIRCUIT USING REINFORCEMENT LEARNING", the entirety of which is hereby incorporated by reference.

FIELD

The present disclosure is generally related to electronic-computer aided design of circuits. In particular, the present disclosure relates to systems and methods for generating a floorplan for a circuit using reinforcement learning.

BACKGROUND

Modern circuit design is generally performed using software such as electronic design automation (EDA) software and generally involves logic synthesis and physical design. Logic synthesis involves converting a register-transfer level (RTL) of a circuit (e.g., a digital integrated circuit) generated using a hardware description language (HDL) (e.g., Verilog or VHSIC hard description language (VHDL; where VHSIC stands for very high speed integrated circuit)), into a netlist, which is a description of the elements of a circuit and the connectivity between the elements. Elements of a circuit that are included in a netlist may include modules (e.g., functional modules of the circuit; also referred to as blocks) and input/output (I/O) pads. Physical design may involve converting the netlist into a geometric representation.

An important part of physical design is floorplanning. Floorplanning refers to the operation of placing all the blocks of a circuit on a circuit board with a goal of optimizing certain metrics (e.g., wirelength, total occupied area, peak temperature during operation, etc.). There may be certain constraints that must be satisfied as well (e.g., non-overlapping placement of blocks, fixed-outline constraints, etc.). Floorplanning may involve placing a large number of blocks (e.g., hundreds of blocks), and there has been interest in developing machine learning-based methods for floorplanning to help reduce design time. However, current machine learning-based methods for floorplanning have limited practical applicability.

Accordingly, there is a continued need for improvements in floorplanning of circuits.

SUMMARY

In various examples, the present disclosure describes methods and systems for generating a floorplan for a desired circuit, using reinforcement learning (RL). A corner block list (CBL) representation is used to represent the floorplan, and a RL agent is trained to generate a sequence of CBL actions in order to construct the floorplan block-by-block.

Examples of the present disclosure may provide a flexible, machine-learning based way to generate an optimized floorplan for a desired circuit. The use of a CBL representation for the floorplan may help to reduce the action space for the RL agent, thus helping to improve the efficiency of training. The disclosed methods and systems may not require the blocks to be placed according to a defined sequence or according to a defined grid, thus increasing flexibility and providing opportunities for a more optimized floorplan to be generated.

Examples of the present disclosure may make use of a hypergraph graph convolutional network (GCN) to encode a netlist graph, instead of a simple graph neural network. The hypergraph GCN may enable hyperedges of the netlist graph to be encoded directly, rather than requiring hyperedges to be first converted to simple edges. This may provide a more efficient encoding of the netlist graph and may result in a graph embedding that more directly represents the structural features of the netlist graph.

The present disclosure also describes an example dot product technique that may be used to map a predicted action in a continuous space to a discrete action value (e.g., a discrete block ID value). This may help to address a challenge commonly found when attempting transfer learning using RL.

In an example aspect, the present disclosure describes a method for generating a floorplan for a circuit. The method includes: obtaining a netlist graph of the circuit and a set of block features associated with blocks of the circuit; using a reinforcement learning (RL) agent to generate a sequence of corner block list (CBL) actions, each CBL action representing a block placement action and being generated by: generating, from the netlist graph, the set of block features and a current CBL representation of the floorplan, a current state embedding representing a current state of the floorplan; and inputting the current state embedding to a policy network of the RL agent to generate a predicted output vector, the predicted output vector from the policy network being used to generate the CBL action; wherein after each CBL action is generated the current CBL representation of the floorplan is updated with the generated CBL action and the set of block features is updated to reflect the state of the floorplan after applying the generated CBL action. The method also includes: outputting the current CBL representation as a final floorplan after all blocks of the circuit have been placed by the sequence of CBL actions.

In an example of the preceding example aspect of the method, generating the current state embedding may include: encoding the netlist graph and the set of block features into a graph embedding using a neural network; encoding the current CBL representation using a lookup table into a CBL embedding; and combining the graph embedding and the CBL embedding to generate the current state embedding.

In an example of the preceding example aspect of the method, encoding the netlist graph and the set of block features into the graph embedding may include: encoding the netlist graph and the set of block features into node embeddings using a hypergraph graph convolutional network (GCN); and pooling the node embeddings into the graph embedding.

In an example of any of the preceding example aspects of the method, each generated CBL action may include a block identifier (ID) value, an insertion direction value, and a T-junction value.

In an example of the preceding example aspect of the method, each generated CBL action may also include a rotation value or an aspect ratio value.

In an example of any of the preceding example aspects of the method, the netlist graph and the set of block features may be encoded into node embeddings and the node embeddings may be pooled into the graph embedding. The predicted output vector from the policy network may be used to determine the block ID value of the CBL action by: computing a dot product of the predicted output and the node embeddings to obtain a probability vector; and determining the block ID value to correspond to an index of a highest probability value in the probability vector.

In an example of any of the preceding example aspects of the method, the method may also include: computing a reward of the final floorplan; updating parameters of the RL agent including parameters of the policy network using the computed reward; and performing at least another iteration using the RL agent to output another final floorplan. The iterations may be repeated until a termination condition is met.

In an example of any of the preceding example aspects of the method, the method may also include: after each CBL action is generated, determining whether the generated CBL action is invalid; and in response to an invalid CBL action, generating a penalty feedback to the RL agent.

In another example aspect, the present disclosure describes a computing system including a memory storing instructions; and a processing unit coupled to the memory. The processing unit is configured to execute the instructions to cause the computing system to: obtain a netlist graph of the circuit and a set of block features associated with blocks of the circuit; use a reinforcement learning (RL) agent to generate a sequence of corner block list (CBL) actions, each CBL action representing a block placement action and being generated by: generating, from the netlist graph, the set of block features and a current CBL representation of the floorplan, a current state embedding representing a current state of the floorplan; and inputting the current state embedding to a policy network of the RL agent to generate a predicted output vector, the predicted output vector from the policy network being used to generate the CBL action; wherein after each CBL action is generated the current CBL representation of the floorplan is updated with the generated CBL action and the set of block features is updated to reflect the state of the floorplan after applying the generated CBL action. The processing unit is also configured to execute the instructions to cause the computing system to: output the current CBL representation as a final floorplan after all blocks of the circuit have been placed by the sequence of CBL actions.

In an example of the preceding example aspect of the system, the processing unit may be further configured to execute the instructions to cause the computing system to generate the current state embedding by: encoding the netlist graph and the set of block features into a graph embedding using a neural network; encoding the current CBL representation using a lookup table into a CBL embedding; and combining the graph embedding and the CBL embedding to generate the current state embedding.

In an example of the preceding example aspect of the system, the processing unit may be further configured to execute the instructions to cause the computing system to encode the netlist graph and the set of block features into the graph embedding by: encoding the netlist graph and the set of block features into node embeddings using a hypergraph graph convolutional network (GCN); and pooling the node embeddings into the graph embedding.

In an example of any of the preceding example aspects of the system, each generated CBL action may include a block identifier (ID) value, an insertion direction value, and a T-junction value.

In an example of the preceding example aspect of the system, each generated CBL action may also include a rotation value or an aspect ratio value.

In an example of any of the preceding example aspects of the system, the netlist graph and the set of block features may be encoded into node embeddings and the node embeddings are pooled into the graph embedding. The predicted output vector from the policy network may be used to determine the block ID value of the CBL action by: computing a dot product of the predicted output and the node embeddings to obtain a probability vector; and determining the block ID value to correspond to an index of a highest probability value in the probability vector.

In an example of any of the preceding example aspects of the system, the processing unit may be further configured to execute the instructions to cause the computing system to: compute a reward of the final floorplan; update parameters of the RL agent including parameters of the policy network using the computed reward; and perform at least another iteration using the RL agent to output another final floorplan. The iterations may be repeated until a termination condition is met.

In an example of any of the preceding example aspects of the system, the processing unit may be further configured to execute the instructions to cause the computing system to: after each CBL action is generated, determine whether the generated CBL action is invalid; and in response to an invalid CBL action, generate a penalty feedback to the RL agent.

In another example aspect, the present disclosure describes a non-transitory computer readable medium having instructions encoded thereon. The instructions, when executed by a processing unit of a computing system, cause the computing system to: obtain a netlist graph of the circuit and a set of block features associated with blocks of the circuit; use a reinforcement learning (RL) agent to generate a sequence of corner block list (CBL) actions, each CBL action representing a block placement action and being generated by: generating, from the netlist graph, the set of block features and a current CBL representation of the floorplan, a current state embedding representing a current state of the floorplan; and inputting the current state embedding to a policy network of the RL agent to generate a predicted output vector, the predicted output vector from the policy network being used to generate the CBL action; wherein after each CBL action is generated the current CBL representation of the floorplan is updated with the generated CBL action and the set of block features is updated to reflect the state of the floorplan after applying the generated CBL action. The instructions also cause the computing system to: output the current CBL representation as a final floorplan after all blocks of the circuit have been placed by the sequence of CBL actions.

In some examples of the example aspect of the computer readable medium, the instructions may also cause the computing system to perform any of the example methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
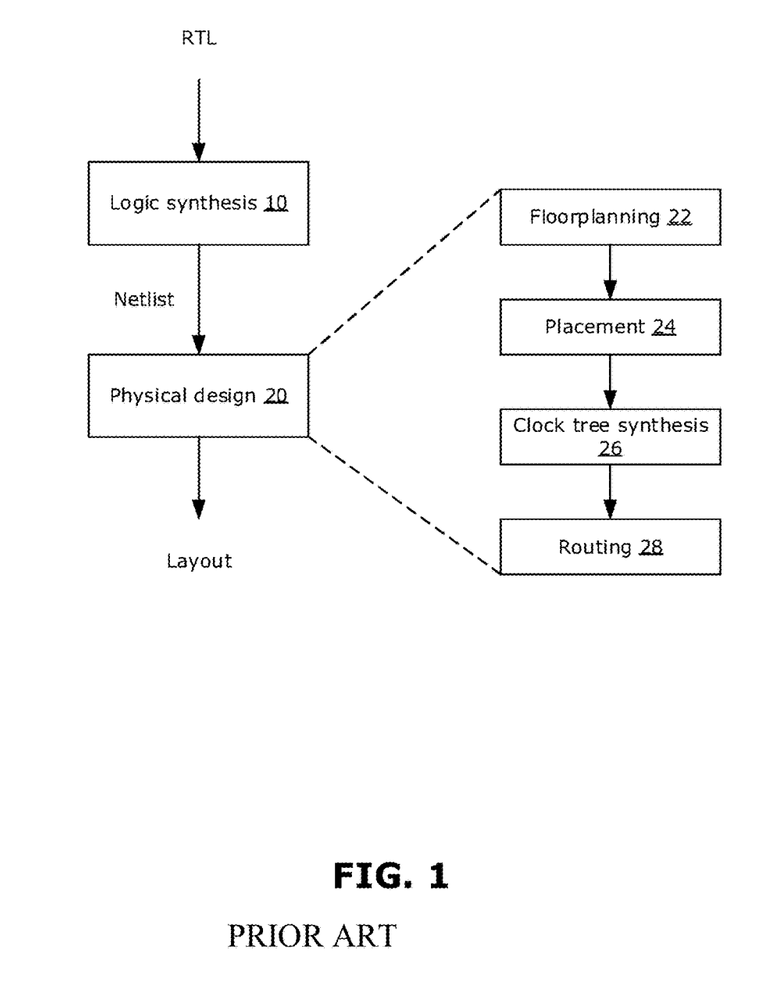
FIG. 1 is a simple flowchart providing an overview of a typical circuit design process.

FIG. 1 illustrates a general overview of a typical circuit design process, involving logic synthesis 10 followed by physical design 20.

Logic synthesis 10 converts a register-transfer level (RTL) of a circuit (e.g., a digital integrated circuit) into a netlist. A netlist describes the connectivity of all the elements of a circuit. For example, a netlist may be a list of all the electronic components of a circuit and the nets each component is connected to.

Physical design 20 refers to the process of generating a circuit board layout (including placement of circuit elements and their connectivity) from a netlist. As shown in FIG. 1, physical design 20 includes the operations of floorplanning 22, placement 24, clock tree synthesis 26, and routing 28 in order to generate a geometric representation of a circuit (i.e., a layout).

Floorplanning 22 involves generating a floorplan (or floorplan layout) for a circuit based on the netlist for the circuit and features of the modules (also referred to as blocks in the field of digital design) of the circuit. The quality of floorplan for the circuit affects others operations of the physical design 20 including placement 24 and routing 28. The problem to be solved by floorplanning 22 may be formulated as follows. Let $B=\{b_1, b_2, \ldots, b_m\}$ be a set of m blocks (also referred to as modules). A block may be a hard block, meaning that the dimensions of the block are fixed (e.g., a fixed width and fixed height). The shape of a hard block cannot be changed, however the width and height of a hard block can be switched by 90° rotation. Another block may be a soft block, which has its area defined but the dimensions of the block may be changed as long as its aspect ratio (defined as width/height) is within a predefined limit. The blocks are connected through a set N of n hyperedges. A hyperedge is an edge that can connect two or more blocks (in contrast to an edge that can connect only two blocks). Each hyperedge in the set N connects a variable number of the blocks, such that the set N may be defined as $N=\{[b_1, b_2, \ldots,], [\ldots], \ldots, [\ldots]\}$. Thus, floorplanning 22 may be a process that includes placing all blocks in a netlist on a circuit board (or chip canvas) to generate a floorplan, denoted F, which aims to optimize certain metrics, such as minimizing wirelength between blocks, minimizing total die area, minimizing peak temperature, or any combination thereof. The floorplan F may be defined as an assignment of $(x_i, y_i, w_i, h_i)$ for each block $b_i$, where $x_i, y_i$ denotes the location (e.g., in x and y coordinates) of the block $b_i$ and where $w_i, h_i$ denotes the dimensions (e.g., width and height, respectively) of the block $b_i$.

Existing approaches for floorplanning include simulated annealing (SA) and analytical methods. SA methods operate on a representation of geometric relationships among circuit blocks. Examples of representations of geometric relationships among circuit blocks include transitive closure graph-sequence (TCG-S) representations, B*-tree representations, and sequence pair representations. In SA methods, the objective metric (e.g., total wirelength, die area, etc.) is optimized by introducing perturbation into the representation of the geometric relationships among circuit blocks in a hill-climbing process. While SA methods have been found to generate sufficiently high quality floorplans when placing only hard blocks, the performance of SA methods when placing soft blocks is often unsatisfactory due to the extra variable of block shape (i.e., variable width and height of soft blocks). Another limitation is that SA methods typically require a long time to execute, and may be unacceptably slow for larger circuits having a large number of blocks (e.g., complex circuits having hundreds of blocks).

Unlike SA methods, analytical methods do not depend on a representation of geometric relationships among blocks. Analytical methods typically have shorter runtime than SA methods and are generally capable of placing soft blocks with a fixed-outline constraint. However, analytical methods may not generate a satisfactory floorplan as reliably as SA methods (e.g., a sub-optimal floorplan or inoperable floorplan may be generated).

A drawback of both SA and analytical methods is their inability to generalize to a new circuit design. For example, floorplans generated using SA and analytical methods must be generated from scratch each time a circuit design is changed, even if the change is small such as the addition or removal of a block and/or a connection in the circuit design. This can lead to increased design time when design iteration is required.

Some machine learning-based methods have been developed for floorplanning, but may have drawbacks. For example, some existing machine learning-based methods may require significant runtime (e.g., thousands of iterations may be required) to generate a satisfactory floorplan. Other existing machine learning-based methods may require blocks to be placed in a fixed sequential order in a fixed grid, which may limit adaptability and/or may require a large amount of the circuit to be whitespace (i.e., having no block placed on the space).

In various examples, the present disclosure describes methods and systems for floorplanning using a reinforcement learning (RL) agent which places blocks of a circuit one-by-one on a canvas (e.g., representing a circuit board or chip canvas), with a goal of minimizing wirelength between blocks. The disclosed methods and systems make use of corner block list (CBL) representation to represent a floorplan.

CBL is a topological representation of a non-slicing floorplan (i.e., a floorplan that cannot be cut vertically or horizontally without cutting through one or more blocks). A CBL may represent a defined floorplan using a tuple (S, L, T), where S is a vector $(s_1, s_2, \ldots, s_m)$ of identifiers (IDs) of the m blocks ("block IDs") that have been placed, L is a vector $(l_1, l_2, \ldots, l_m)$ of insertion direction (sometimes referred to as corner block orientations) for the m blocks that have been placed, and T is vector $(t_1, t_2, \ldots, t_m)$ of the number of T-junctions covered by the m blocks that have been placed. The elements of L are binary in value, for example $l_i$ may have a value of 0 or 1, where a value of 0 may indicate that a block is inserted from a vertical direction and a value of 1 may indicate that a block is inserted from a horizontal direction. The elements of T are integers, typically less than or equal to five (e.g., a maximum permissible value for $t_i$ may be predefined). In some examples, a CBL representation may be (S, L, T, R) where R is a vector $(r_1, r_2, \ldots, r_m)$ of rotation digits (where $r_i$ is a binary value, for example 0 or 1) to indicate if a block is rotated by 90°.

The CBL representation has intrinsic sequential property, in that the floorplan defined by the CBL is to be constructed one block at a time over the steps i=1, ... m. Construction of the floorplan using CBL representation follows a set of defined rules, for example that the origin (i.e., the (0,0) coordinate) is defined to be the bottom-left corner of the floorplan and that each block is placed as far left or as far down as possible (depending on the insertion direction). For each ith step, the block to be placed in the canvas and the manner in which the block is placed are fully defined by the tuple $(s_i, l_i, t_i)$. It should be noted that, for a set of blocks $B=\{b_1, b_2, \ldots, b_m\}$, where $b_i$ is the block ID of the ith block, it is not necessarily true that $s_i=b_i$. For example, the block having block ID 1 is not necessarily the first-placed block according to the CBL. It should be noted that the position coordinate of each block (i.e., $(x_i, y_i)$ of the block having block ID indicated by $s_i$) can be fully determined based on the locations of the blocks that have been already placed and the block placement action defined by the tuple $(s_i, l_i, t_i)$ (or optionally the block placement action defined by $(s_i, l_i, t_i, r_i)$).

Figure 2:
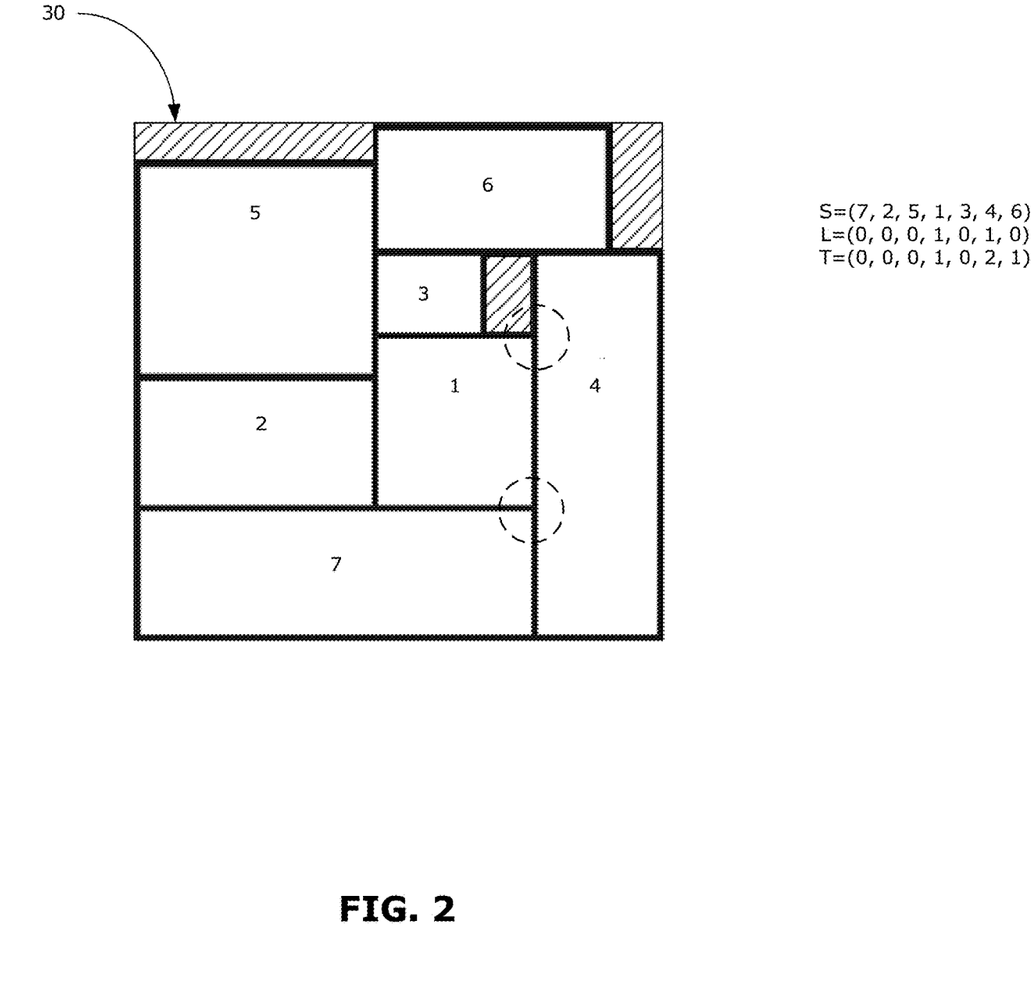
FIG. 2 illustrates a simple floorplan and associated CBL representation.

FIG. 2 illustrates an example CBL representation of a simple floorplan. The example floorplan 30 includes a set of blocks B={1, 2, 3, 4, 5, 6, 7}. In this example, the CBL representation is in the form of a tuple (S, L, T) where the vector S is (7, 2, 5, 1, 3, 4, 6), the vector L is (0,0,0,1,0,1,0) and the vector T is (0,0,0,1,0,2,1). Thus, starting from a blank floorplan (also referred to as a blank canvas), the first block placement action is defined by $(s_1, l_1, t_1)$=(7, 0, 0). This means that the first block that is placed is the block having block ID 7, where the block is inserted from the vertical direction (indicated by the binary value $l_1$=0) and there are no T-junctions formed. The second block placement action is defined by $(s_2, l_2, t_2)$=(2, 0, 0), meaning the block having block ID 2 is placed, inserted from the vertical direction and forming no T-junctions. In this way, the floorplan is created by placing blocks one at a time, each ith block placement action being defined by a corresponding $(s_i, l_i, t_i)$ tuple. It should be noted that the ith block placement action is defined with respect to the blocks that have already been placed, and is not affected by blocks that have not been placed. For example, the block having block ID 4 (also referred to simply as block 4) is placed by the sixth block placement action $(s_6, l_6, t_6)$=(4, 1, 2), meaning block 4 is inserted from a horizontal direction (indicated by the binary value $l_6$=1) and two T-junctions are formed (indicated by dashed circles in FIG. 2). Notably, $t_6$=2 to indicate that two T-junctions are formed by the placement of block 4, despite the fact that there are actually three T-junctions at block 4. This is because the third T-junction is formed by the placement of the last block having block ID 6, which is after placement of the block 4.

The sequential property of CBL representation makes it possible to divide the floorplanning problem into smaller problems, helping to reduce the problem complexity. As well, the intrinsic sequential order of CBL representation makes this a good candidate for optimization using a RL agent. It may also be noted that a block placement action (also referred to simply as an action) defined using CBL representation (also referred to as a CBL action) inherently encodes a block's spatial relationship with its neighbors, unlike an action that is defined using absolute (x, y) coordinates.

In various examples, the present disclosure describes methods and systems that use a RL agent that accepts as input a netlist representation of a circuit and that generates a predicted action (in the form of a CBL action) for placement of a block. The RL agent is trained to optimize a reward based on the total length of all connections between blocks in a completed floorplan. The use of CBL representation may help to reduce the action space (i.e., the space of all possible actions) to be explored and/or learned by the RL agent, thus enabling the RL agent to be trained in a practical amount of time. The disclosed methods and systems do not require blocks to be placed according to a fixed defined block sequence, and may thus result in more optimized floorplans. Further, after the RL agent has been trained to construct a floorplan for a given netlist, the RL agent may be retrained in a relatively short amount of time (e.g., requiring only a few iterations) to construct a floorplan for a slightly modified netlist (e.g., added/removed connection, added/removed block, etc.).

To assist in understanding the present disclosure, an example computing system that may be used to implement examples of the present disclosure is first described.

Figure 3:
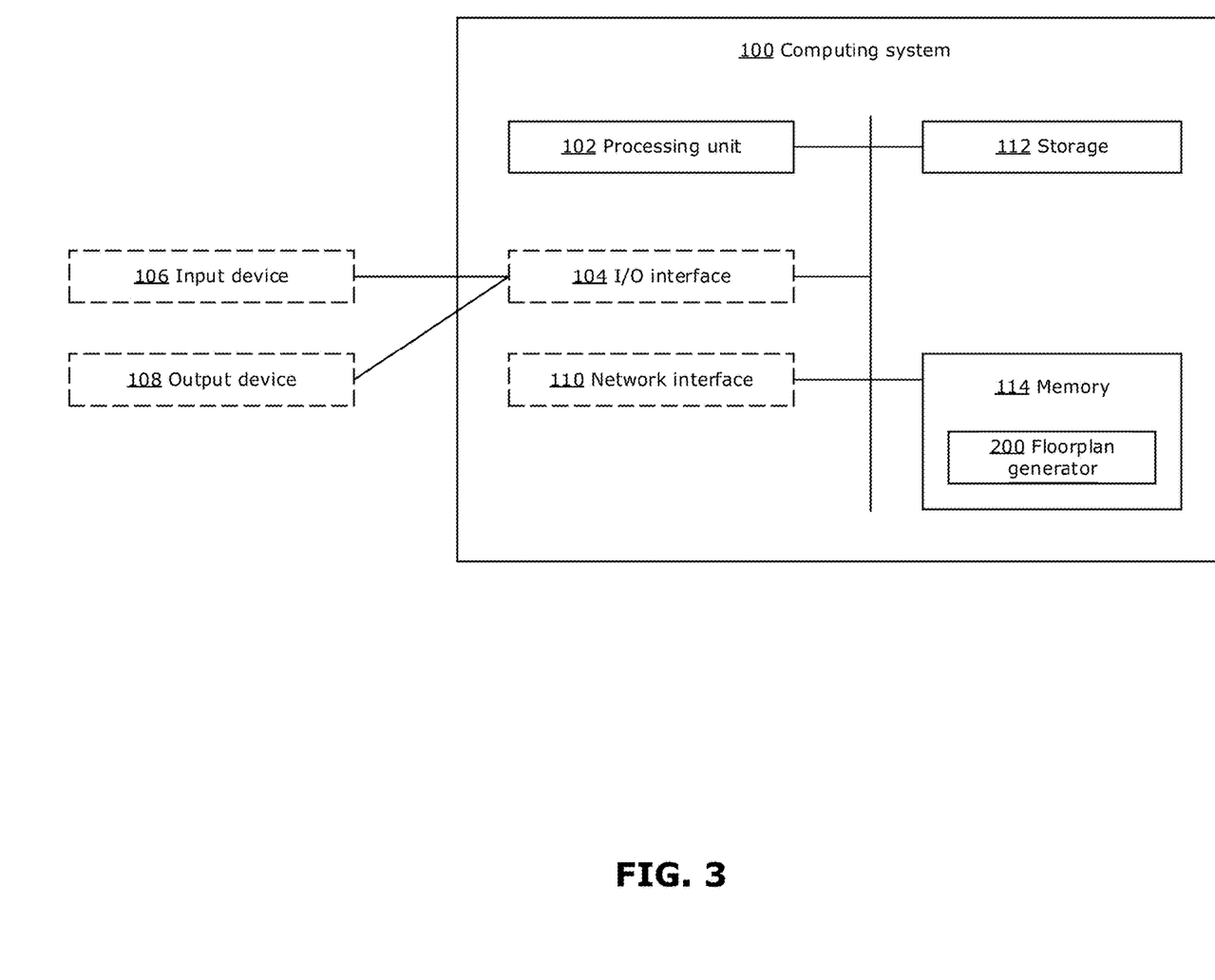
FIG. 3 is a block diagram of an example computing system, in accordance with examples of the present disclosure.

FIG. 3 is a block diagram illustrating a simplified example implementation of a computing system 100 suitable for implementing embodiments described herein. Examples of the present disclosure may be implemented in other computing systems, which may include components different from those discussed below.

Although FIG. 3 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes at least one processing unit 102, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. Each of the processing unit(s) 102 may include one or more processing cores. In some examples, the processing unit 102 may perform operations in conjunction with a computing platform. Accordingly, the performance of operations may be distributed among one or more processing units 102, whether residing only within a single machine (e.g., a single computing system 100) or deployed across a number of machines (e.g., multiple computing systems 100). For example, one or more processing units 102 may be located in a single geographic location (e.g., within a home environment, an office environment, or a server farm), or may be distributed across a number of geographic locations.

The computing system 100 may include an optional input/output (I/O) interface 104, which may enable interfacing with an optional input device 106 and/or optional output device 108. In the example shown, the optional input device 106 (e.g., a keyboard, a mouse, a microphone, a touchscreen, and/or a keypad) and optional output device 108 (e.g., a display, a speaker and/or a printer) are shown as external to the computing system 100, however one or more input device(s) 106 and/or output device(s) 108 may be an integral component of the computing system 100. In other example embodiments, there may not be any input device 106 and output device 108, in which case the I/O interface 104 may not be needed.

The computing system 100 may include an optional network interface 110 for wired or wireless communication with other computing systems (e.g., other computing systems in a network). The network interface 110 may include wired links (e.g., Ethernet cable) and/or wireless links (e.g., one or more antennas) for intra-network and/or inter-network communications.

The computing system 100 may include a storage unit 112, which may include a mass storage unit such as a solid state drive, a hard disk drive, a magnetic disk drive and/or an optical disk drive. The storage unit 112 may store data, for example.

The computing system 100 includes at least one memory 114, which may include a volatile or non-volatile memory (e.g., a flash memory, a random access memory (RAM), and/or a read-only memory (ROM)). The non-transitory memory 114 may store instructions for execution by the processing unit 102, such as to carry out example embodiments described in the present disclosure. For example, the memory 114 may store instructions for implementing a floorplan generator 200 disclosed herein. The memory 114 may store other software instructions, such as for implementing an operating system and other applications/functions (e.g., other operations in digital chip design, such as placement, clock tree synthesis and/or routing operations). The memory 114 may also store data, such input data (e.g., netlist data) for the floorplan generator 200 and parameters of a hypergraph graph convolutional network (GCN) and the policy neural network of the RL agent disclosed herein. The memory 114 may also store data generated by the RL agent, embeddings and predicted actions (as discussed further below).

The computing system 100 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 4:
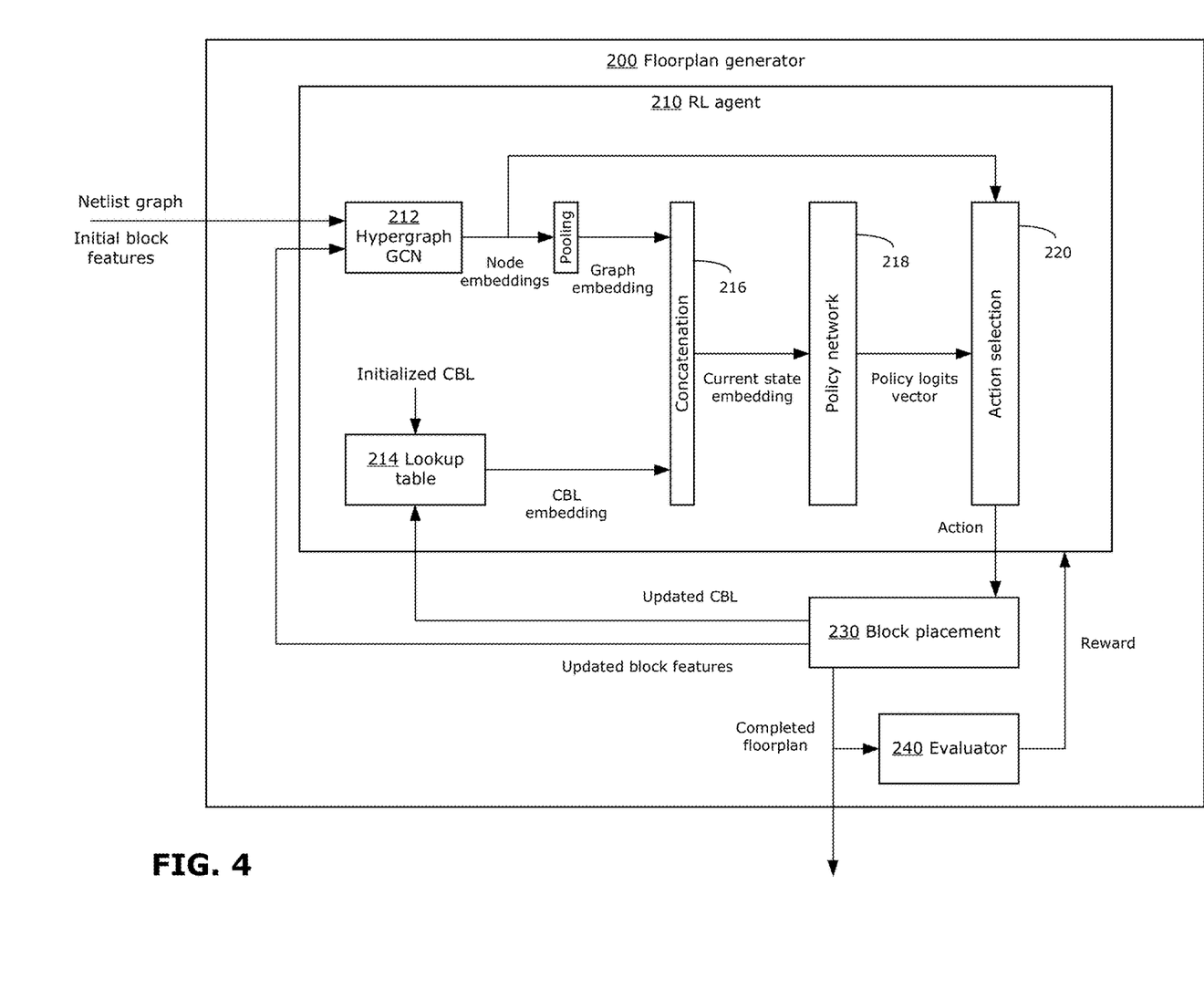
FIG. 4 is a block diagram of an example floorplan generator, in accordance with examples of the present disclosure.

FIG. 4 is a block diagram showing details of an example floorplan generator 200. As mentioned above, the floorplan generator 200 may be implemented by the computing system 100 (e.g., using the processing unit 102 to execute instructions stored in the memory 114 for performing the operations of the floorplan generator 200 as disclosed herein).

The netlist of the desired circuit may be preprocessed into a netlist graph (or the netlist may already be in the form of a netlist graph) that represents circuit elements as nodes of the graph and connections among elements as hyperedges. In a circuit, there are typically connections that connect more than two elements of the circuit, thus the connections may be more readily represented using hyperedges (which can connect more than two nodes) rather than simple edges (which can connect only two nodes). The netlist graph is provided as input to the floorplan generator 200.

A set of initial block features is also provided as input to the floorplan generator 200. Block features are features associated with each block in the netlist, and may be thus represented as node features of the netlist graph. The block features associated with each block include the block height, block width, a binary flag to indicate whether a block has been placed and (x, y) coordinates of the block (after the block has been placed). In the case where the blocks may include hard blocks as well as soft blocks, the block features associated with each block may also include a binary value to indicate whether that particular block is a hard block (e.g., a value of 1) or a soft block (e.g., a value of 0). Initially, no block has been placed and the dimensions of soft blocks have not been fixed. Thus, the initial block features may include only the height and width features associated with each hard block (optionally, the area of the hard block may be included in the initial block features). The initial block features associated with each soft block may additionally include the area as a feature (the height and width feature of each soft block may be initially set to be equal). If a block has predefined pin locations, the (x, y) coordinates of the predefined pin locations may be included in the initial block features for that block. If the netlist includes both hard blocks and soft blocks, the initial block features may also indicate whether each given block is a hard or soft block. As will be discussed further below, the set of block features is updated after each action to reflect the (x, y) coordinates of the block placed by the latest action and to update the binary flag to indicate the latest block has been placed. Further, in the case of a soft block, the width and height features are updated after the block has been placed.

The floorplan generator 200 includes a RL agent 210 that, at each timestep, predicts an action (in the form of a CBL action) for placing a block in the floorplan. Each action is processed by a block placement module 230 to place the indicated block. The block placement module 230 also updates the CBL and block features to reflect the placed block. The RL agent 210 uses the updated CBL and block features to predict the next action at the next timestep (to place the next block in the floorplan). When all blocks of the netlist have been placed, the block placement module 230 outputs the completed floorplan (in the form of a CBL representation). The completed floorplan is evaluated by an evaluator module 240, which computes a reward that is fed back to the RL agent 210. The construction of a completed floorplan and computation of the corresponding reward may define a single iteration of training for the RL agent 210. When the RL agent 210 has been sufficiently trained (e.g., the reward has been optimized or a maximum number of iterations have been performed), the completed floorplan (in the form of a CBL representation) is outputted by the floorplan generator 200.

Some details of the RL agent 210 are now discussed. The RL agent 210 includes a hypergraph GCN 212 which is configured to encode the netlist graph and set of block features into node embeddings. Each node embedding corresponds to a respective node (i.e., block) of the netlist graph (i.e., if there are N blocks in the netlist graph, then there are N node embeddings), and each node embedding has the same length. The node embeddings are feature vector representations that represent the block features and interconnections of each node (i.e., block) in the netlist graph. The node embeddings are pooled (e.g., using a global pooling layer) to generate a graph embedding, which is a feature vector representation of the entire netlist graph.

It should be understood that, although a hypergraph GCN 212 is shown, the netlist graph and block features may be encoded into node embeddings using other graph neural networks (GNNs), such as a GNN configured to process simple graphs (i.e., a graph having simple edges rather than hyperedges). Using a hypergraph GCN 212 may be advantageous because the netlist graph can be processed more directly (without having to convert hyperedges into simple edges), however in other examples a simple GNN may be used. Thus, the present disclosure is not limited by the specific neural network that is used to generate the node embeddings.

The RL agent 210 also includes a lookup table 214 that receives a CBL representing the current state of the floorplan and encodes the CBL into a CBL embedding (a feature vector representation of the current CBL). Using the lookup table 214, the block ID of each block in the CBL is encoded into a vector representation. Further, the insertion direction value and the T-junction value for each block in the CBL are also encoded by normalization against the upper bound of their respective ranges. For example, the insertion direction value is binary and has an upper bound of one, and the T-junction value may be normalized based on an upper bound of a maximum value of five. If the CBL includes a fourth value (e.g., a value for rotation or aspect ratio), this may be similarly encoded into the CBL embedding. In this way, each CBL action in the CBL is encoded and are then concatenated together to generate the CBL embedding. At the start of each iteration, the CBL may be initialized to zero (or empty). As the floorplan is constructed block-by-block, the CBL is updated to reflect the state of the floorplan and the updated CBL is encoded into a CBL embedding using the lookup table 214.

While the graph embedding contains block feature information (e.g., size, area, type, position, etc.) and structural information of the netlist graph (e.g., proximity, centrality, interconnections of the nodes, etc.), the CBL embedding contains information about the blocks that have been placed in the floorplan. The graph embedding and the CBL embedding are concatenated at a concatenation operation 216 to generate a current state embedding. The current state embedding thus represents information about the current state of the floorplan (as described by the current CBL) as well as information about the desired circuit (as described by the netlist graph). The current state embedding thus captures information that can be used by a policy network 218 (also referred to as a policy neural network) to generate predictions which are then used to select an action to place the next block.

The policy network 218 is a neural network that maps the current state embedding to a predicted policy logits vector. The predicted policy logits vector is a vector of logits (which represent probabilities corresponding to the features of the current state embedding) which is converted by an action selection module 220 into a CBL action to select and place the next block.

The CBL action outputted by the action selection module 220 includes a block ID, an insertion direction value, a T-junction value and a fourth value that depends on whether the block corresponding to the block ID is a hard block or a soft block. In the case of a hard block, the fourth value is a rotation value (indicating whether the block is not rotated or whether the block is rotated by 90°); in the case of soft block, the fourth value is an aspect ratio value representing the aspect ratio for the soft block. In some examples, the fourth value may be omitted. For example, it may be assumed that hard blocks are not rotated and that soft blocks have a default aspect ratio. The inclusion of the fourth value in the generated action may enable better optimization of the floorplan (e.g., more optimized based on wirelength and/or area criteria).

For the ith timestep, the action selection module 220 outputs an action $(s_i, l_i, t_i, r_i)$. The action selection module 220 may use a Bernoulli distribution (or other binomial distribution) to convert the policy logits to a binary value for the insertion direction value $I_i$ and a binary value for the rotation value $r_i$ (in the case where a hard block is being placed). If a soft block is being placed, the action selection module 220 may normalize the policy logits to an aspect ratio value $r_i$ within the defined permissible aspect ratio range. The action selection module 220 may use a categorical distribution to convert the policy logits to a discrete value (e.g., an integer from 0 to 5) for the T-junction value $t_i$.

As mentioned above, the disclosed methods and systems do not place blocks according to a predefined block sequence. This means that the action generated at each timestep must also include a block ID value $s_i$. The block ID value is a discrete value whose range is variable (dependent on the number of circuit elements in the netlist). Generally, it is a challenge to predict a discrete value with a varying-size action space using reinforcement learning. To address this challenge, the action selection module 220 selects the block ID value by computing a dot product of the predicted policy logits vector with the node embeddings.

Figure 5:
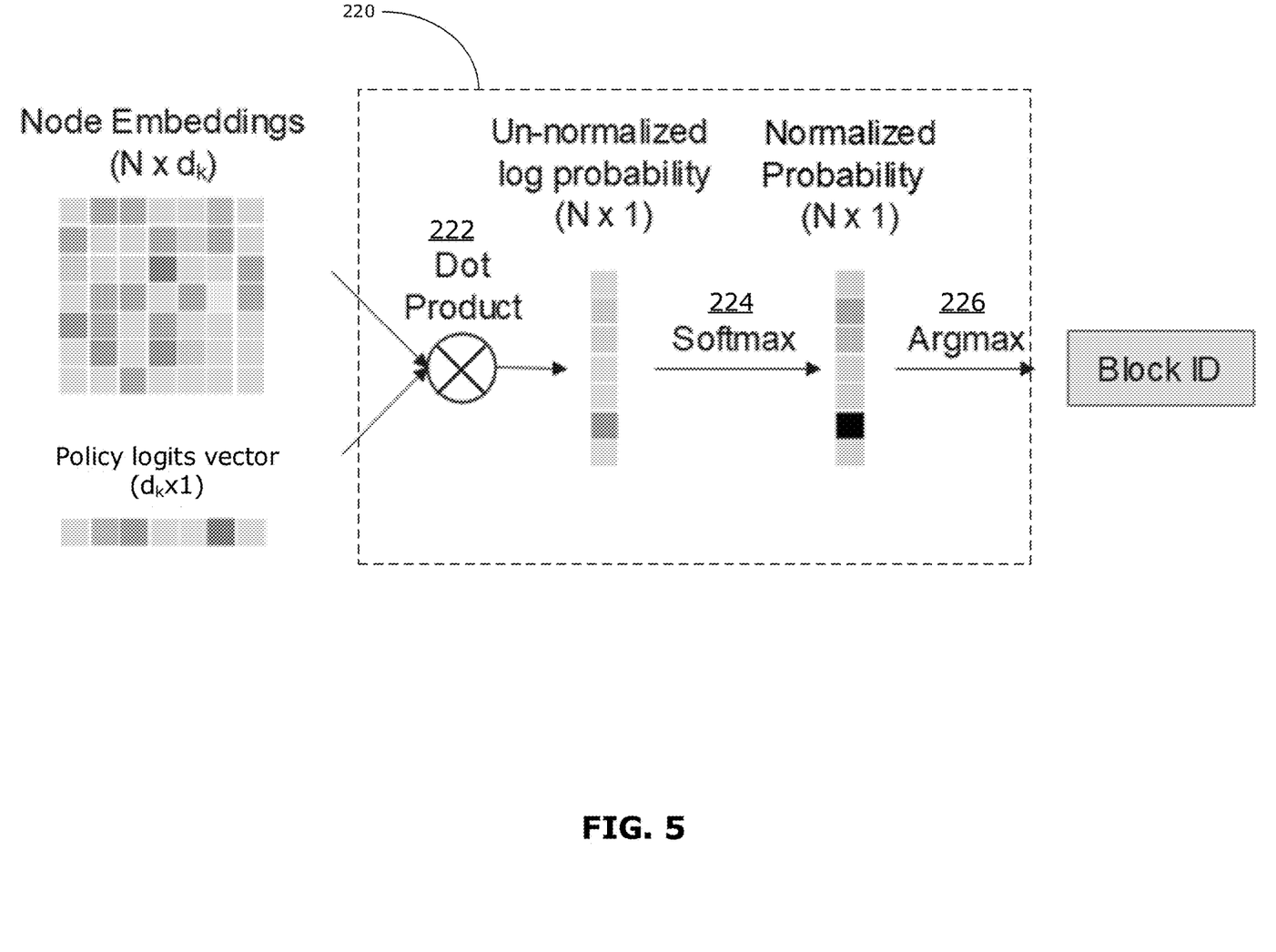
FIG. 5 illustrates an example dot product technique for mapping policy logits to a discrete block ID value, in accordance with examples of the present disclosure.

FIG. 5 is a diagram that illustrates an example of how the action selection module 220 selects the block ID value for an action. In FIG. 5, shading is used to indicate the values of entries in the vectors (with a darker shading indicating a higher value). The action selection module 220 receives the node embeddings (generated by the hypergraph GDN 212), which are N vectors of length $d_k$, and the policy logits vector, which is one vector of length $d_k$. In this simplified example, N is 7 and $d_k$ is 7 (it should be noted that the values of N and $d_k$ are not necessarily always equal). The policy logits vector is used as a query vector applied to the node embeddings, using a dot product operator 222. The result of the dot product is an un-normalized log probability vector of length N. A softmax function 224 is applied to obtain a normalized probability vector of length N. Each entry in the normalized probability vector represents the probability of a corresponding block ID being selected. That is, the index of the highest probability value in the normalized probability vector corresponds to the block ID that is selected as the block ID value for the action. In this example, the sixth entry in the normalized probability vector has the highest probability (indicated by the darker shading). Thus, when the argmax function 226 is applied the selected block ID corresponds to block ID 6.

In some examples, instead of using the dot product technique disclosed herein, a K-nearest neighbors (KNN) algorithm may be used instead. KNN is a known machine learning algorithm that is able to solve classification problems, and that has been shown to be able to map a predicted action in a continuous space to a nearest discrete action. However, using the dot product technique disclosed herein may be less complex than using the KNN technique.

In this way, a CBL action is generated by the RL agent 210 at each timestep. Each generated action is used by the block placement module 230 to update the floorplan. For example, the block placement module 230 may add the CBL action to the CBL, thus updating the CBL. The block placement module 230 may also update the block features. For example, the block placement module 230 may calculate the (x, y) coordinates of the block placed by the latest action and include the calculated (x, y) coordinates in the block features of the corresponding block, as well as updating the binary flag of the corresponding block to indicate that block has been placed, and updating the width and height of the placed block if a soft block has been placed by the latest action. The block placement module 230 may follow defined CBL block packing rules. For example, the first block in the CBL may always be placed at the origin (i.e., the bottom left corner of the floorplan) and subsequent blocks are placed relative to previously placed blocks. The updated CBL and updated block features generated by the block placement module 230 are fed back to the lookup table 214 and the hypergraph GCN 212, respectively, to generate the CBL embedding and node embeddings for the next timestep.

When all blocks have been placed (e.g., the block placement module 230 may check whether the updated CBL contains all nodes of the netlist graph; or may check whether the updated block features show that all blocks have been placed), the floorplan is considered to be completed. The completed floorplan, in the form of a completed CBL, is evaluated by the evaluator module 240.

The evaluator module 240 computes a reward that is fed back to train the RL agent 210 (i.e., to update the parameters of the neural networks of the RL agent 210, such as the weights of the hypergraph GCN 212 and the weights of the policy network 218). The reward may be based on the length of the connections in the completed floorplan, for example the reward may be computed based on a negative wirelength such that the optimized reward is obtained when the wirelength is minimized (thus the optimized reward is the least negative wirelength). This means that the RL agent 210 is trained to generate floorplans with connections that are preferably shorter. A common technique for approximating the length of connections in a circuit is half-perimeter wirelength (HPWL). Thus, the evaluator module 240 may use the negative HPWL of the completed floorplan to compute the reward. The reward is fed back to update the parameters of the RL agent 210, for example using any suitable existing policy gradient algorithm. In some examples, the RL agent 210 is updated using a proximal policy optimization (PPO) algorithm.

In addition to computation of the reward at when the floorplan has been completed, optionally the block placement module 230 may be capable of checking, at every timestep, whether a generated action should be penalized. For example, the RL agent 210 may be penalized when an invalid action (e.g., placement of a block that overlaps a previously-placed block, placement of a block outside the boundary of the floorplan (which is defined in the design requirements), etc.) is generated. The penalty, or penalty feedback, (not shown) from the block placement module 230 may be a negative intermediate reward for that timestep (the intermediate reward for a valid action may be zero). The RL agent 210 thus will be trained to avoid generating invalid actions.

Figure 6:
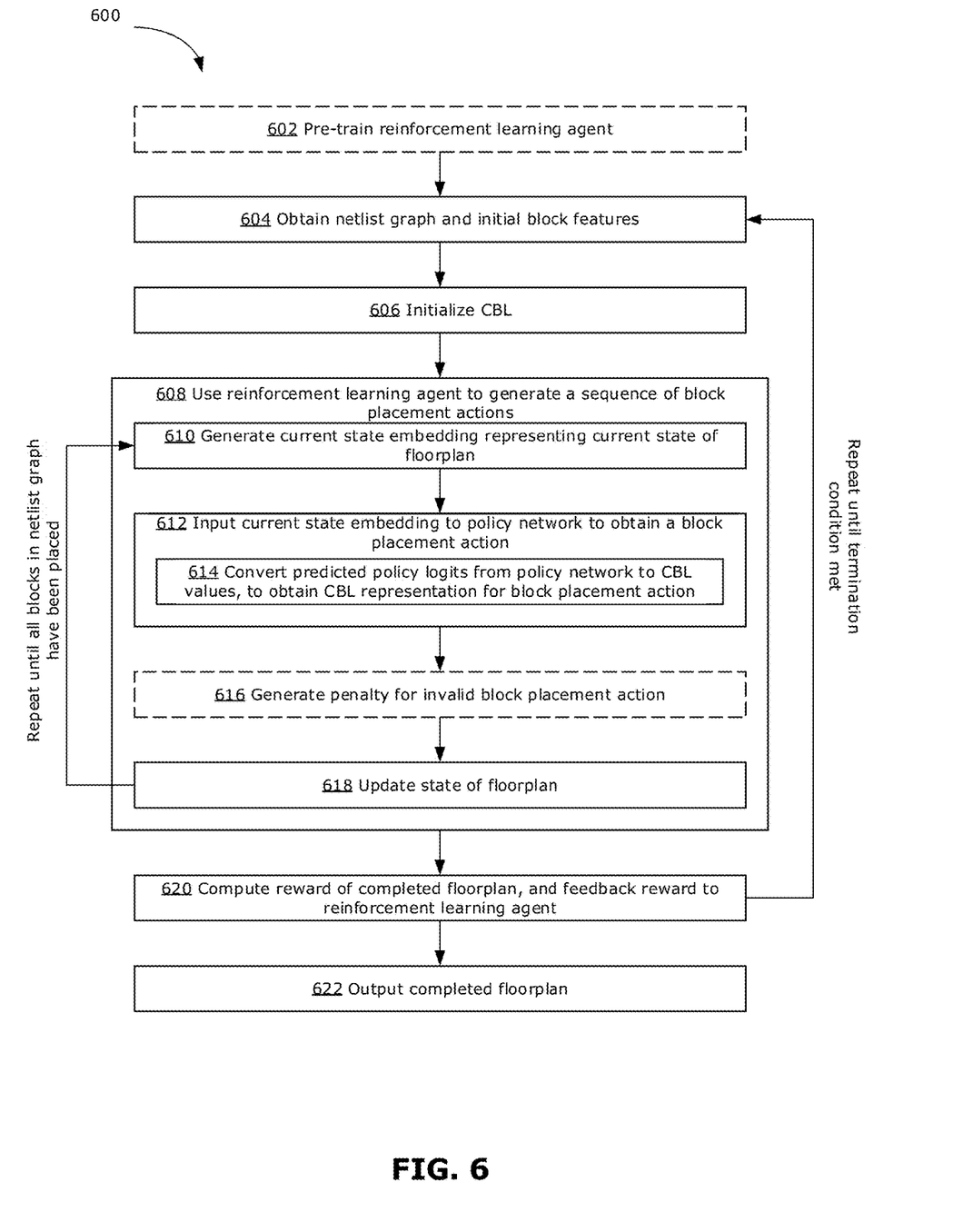
FIG. 6 is a flowchart of an example method for generating a floorplan, in accordance with examples of the present disclosure.

FIG. 6 is a flowchart of an example method 600 for generating a completed floorplan from a netlist, for example using the floorplan generator 200. The method 600 includes the use of a RL agent (e.g., the RL agent 210 as described above) to generate block placement actions (also referred to simply as actions) using CBL representation, to construct the floorplan block-by-block. The completed floorplan may be outputted as a CBL, to be used in other operations for planning a circuit layout (e.g., in subsequent placement, clock tree synthesis and routing operations). The example method 600 may be performed by the computing system 100 (e.g., by the processing unit 102 executing instructions stored in the memory 114).

Optionally, at 602, the RL agent may be pre-trained. Pre-training the RL agent may involve optimizing some parameters of the RL agent on some preliminary task, so that when the RL agent is subsequently trained for the target task (i.e., generation of block placement actions in this disclosure) optimization of the parameters can be achieved more efficiently. For example, the weights of the hypergraph GCN layers may be pre-trained to predict the reward associated with each graph that has been completely placed. Then, in the following primary task (i.e., floorplanning), the learned parameters from the pre-training may be fixed or fine-tuning of the learned parameters may be permitted to help accelerate learning process. Another form of pre-training may be training a complete RL agent (including the hypergraph GCN and policy network) to generate a floorplan for a first circuit. The RL agent that has been trained to generate the floorplan for that first circuit may be used as a starting point to be further trained to generate the floorplan for a different second circuit (e.g., a circuit that is slightly different from the first circuit, for example by addition/removal/change of only a few blocks or connections).

At 604, a netlist graph and a set of initial block features are obtained. As mentioned above, the netlist graph is a hypergraph representation of the netlist for a desired circuit. The netlist graph and the set of initial block features may be obtained from a logic synthesis operation, for example (the netlist from the logic synthesis operation may be preprocessed into a netlist graph). The set of block features are the features associated with each node (i.e., block) in the netlist graph. The block features associated with each block include the block height, block width, a binary flag to indicate whether a block has been placed and (x, y) coordinates of the block (after the block has been placed). In the case where the netlist graph include both hard blocks and soft blocks, the block features associated with each block may also include a binary value to indicate whether that particular block is a hard block (e.g., a value of 1) or a soft block (e.g., a value of 0).

At 606, a CBL representation of the floorplan is initialized.

At 608, the RL agent is used to generate a sequence of block placement actions. In particular, the RL agent generates each block placement action using a CBL representation (a CBL representation of a block placement action may be referred to simply as a CBL action).

Each CBL action includes a block ID value indicating the block to be placed (the block ID value is a value from the set of block IDs as defined by the netlist graph), an insertion direction value indicating the block insertion direction (the insertion direction value is a binary value), and a T-junction value indicating the number of T-junctions formed by placement of the indicated block (the T-junction value typically has a maximum value of 5). In some examples, the CBL action may also include a fourth value, which may be a binary rotation value indicating whether the block is rotated by 90° (in the case of a hard block) or may be an aspect ratio value (in the case of a soft block).

The RL agent uses a policy network to map a current state of the floorplan (represented by a current state embedding) to a predicted output, which is used to generate a block placement action. After a block placement action is generated, the state of the floorplan is updated (by updating the CBL representation of the floorplan and by updating the block features) to reflect the floorplan after the generated block placement action has been applied. This is repeated until all blocks of the circuit have been placed using the generated sequence of block placement actions. This is described in greater detail with respect to steps 610 to 618.

At 610, a current state embedding is generated to represent the current state of the floorplan. In particular, the current state embedding is a feature representation of the netlist graph, the current block features and the current CBL representation of the floorplan. If no action was previously generated, the current block features are the initial block features and the current CBL is the initialized CBL. If at least one action was previously generated, then the current block features and the current CBL are the block features and CBL obtain after applying the previously generated action to the floorplan.

As discussed above, the RL agent may make use of a hypergraph GCN (or other GNN) and a lookup table to generate the current state embedding. The current state embedding may be generated by combining (e.g., concatenating) a graph embedding that is encoded from the netlist graph and a CBL embedding that is encoded from the current CBL. For example, the netlist graph may be encoded into node embeddings using a hypergraph GCN (or other GNN), and the node embeddings may then be pooled to generate the graph embedding. Each CBL action in the current CBL may be encoded into a respective action embedding and the action embeddings may then be combined (e.g., concatenated) to obtain the CBL embedding. Encoding each CBL action may involve using a lookup table to encode the block ID and normalizing other values of the action against their respective upper bounds.

At 612, the current state embedding is inputted to the policy network of the RL agent. The predicted output from the policy network is used to obtain a block placement action. The policy network may map the current state embedding to a predicted policy logits vector. The predicted policy logits vector is a vector of logits (which represent probabilities corresponding to the features of the current state embedding). At 614, the predicted policy logits may be converted into CBL values, to obtain a CBL representation of a block placement action. For example, a dot product with the node embeddings may be computed to convert the policy logits to a selected block ID. A Bernoulli distribution may be used to convert the policy logits to an insertion direction value; and a categorical distribution may be used to convert the policy logits to a T-junction value.

The generated block placement action is outputted from the RL agent and is used to place a block in the floorplan.

Optionally, at 616, if the block placement action is invalid (e.g., places a block that overlaps with a previously-placed block, places a block outside the boundary of the floorplan, or violates some other defined constraint), a penalty (i.e., a negative intermediate reward) may be generated and fed back to the RL agent. The penalty (or penalty feedback) resulting from the invalid action means that the RL agent is trained to avoid generating the invalid action.

At 618, the state of the floorplan is updated to reflect the floorplan after the newly generated block placement action has been applied. Because the floorplan is represented using CBL, updating the state of the floorplan involves updating the CBL (e.g., by adding the generated block placement action to the CBL). As well, the block features are updated to reflect that the block ID indicated in the block placement action has been newly placed, and to include the (x, y) coordinates of the newly placed block. If the newly placed block is a soft block, the block features may also be updated to reflect the height and width of the block (in accordance with the aspect ratio indicated in the block placement action).

If there remains one or more blocks to be placed (e.g., the block features indicate at least one block is not placed), the method 600 returns to step 610 to generate the next block placement action. If all blocks have been placed (e.g., the block features indicate that all blocks have been placed), then the method 600 proceeds to step 620.

At 620, the reward of the completed floorplan is computed and is fed back to the RL agent. For example, the negative HWPL of the completed floorplan may be computed and used as the reward. Then a suitable policy gradient algorithm (e.g., PPO) may be used to update the parameters of the RL agent.

The steps 604 to 620 may be iterated (one pass through steps 604 to 620 being one iteration) until a termination condition is met. A termination condition may be that the reward has been optimized (e.g., no longer significantly changes from one iteration to the next) or that a maximum number of iterations has been reached. At the start of each iteration, the set of block features may be reset to the initial block features. For example, all binary flags indicating whether a block has been placed may be reset to zero (to indicate none of the blocks have been placed), and the (x, y) coordinates for all blocks may be reset to zero (or empty).

After the termination condition is met, at 622 the completed floorplan from the most recent iteration is outputted as the final completed floorplan. The final completed floorplan may be outputted as a CBL, for example.

Figure 7:
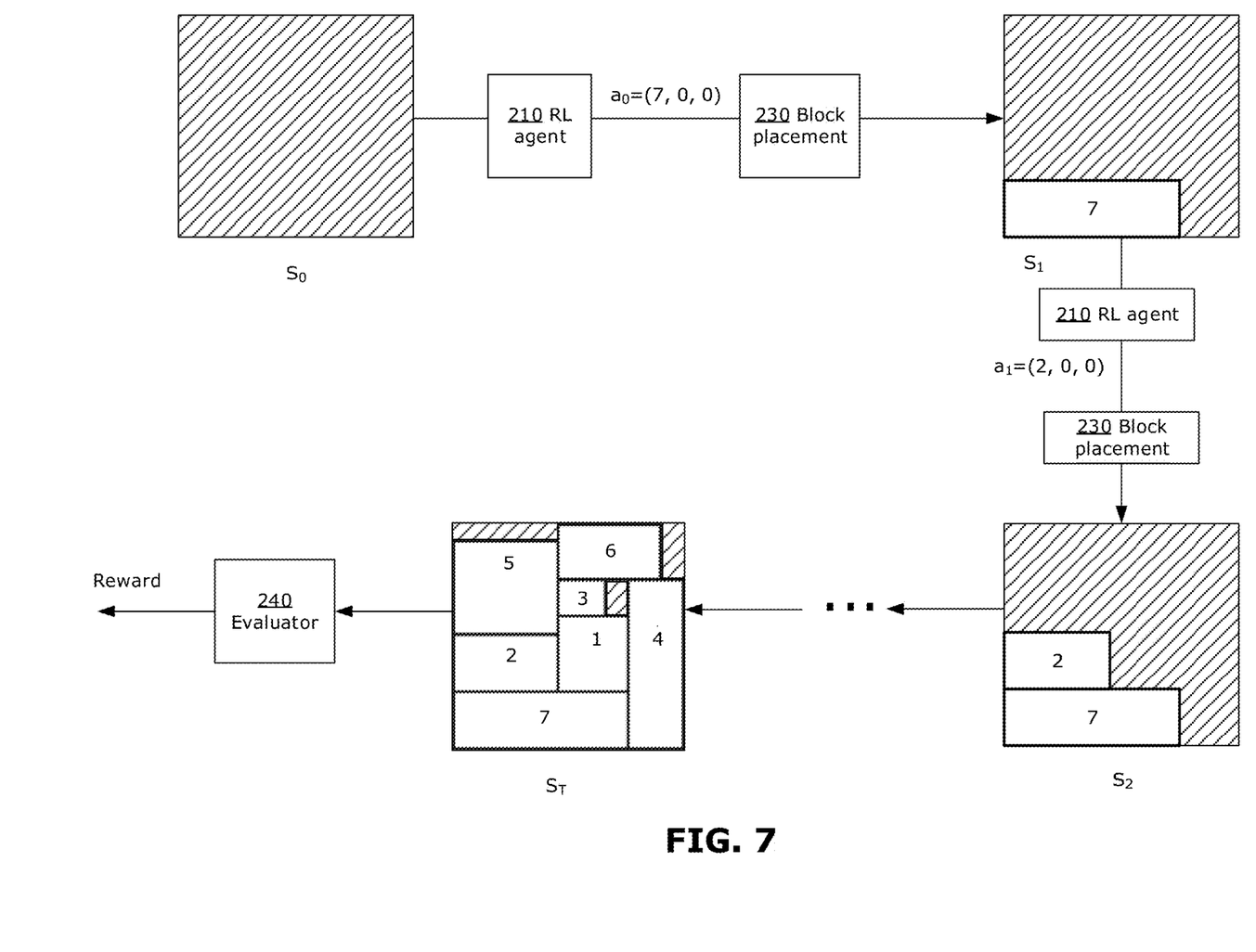
FIG. 7 illustrate a simple example of how a floorplan may be constructed block-by-block, in accordance with examples of the present disclosure.

FIG. 7 is a simplified example illustrating how a floorplan may be constructed block-by-block, using examples of the present disclosure (e.g., using the floorplan generator 200 as shown in FIG. 4 and/or using the method 600 of FIG. 6).

FIG. 7 shows a floorplan at an initial state $S_0$ (represented by an initialized, empty CBL). Using the RL agent 210 of the floorplan generator 200, a CBL action $a_0=(7, 0, 0)$ is generated (indicating that block ID 7 is to be placed, inserted vertically and creating no T-junctions). This action is used by the block placement module 230 to update the CBL and block features to reflect the new state $S_1$ of the floorplan. The updated state $S_1$ of the floorplan is processed by the RL agent 210 to generate the next CBL action $a_1=(2, 0, 0)$ (indicating that block ID 2 is to be placed, inserted vertically and creating no T-junctions). Again, the block placement module 230 uses this action to update the CBL and block features to reflect the new state $S_2$ of the floorplan. This process continues, building up the floorplan block-by-block until, after some timestep T, the floorplan is complete at state ST.

The completed floorplan is evaluated using the evaluator module 240 to obtain a reward, which is used to update the parameters of the RL agent 210. If the reward has been optimized, then the completed floorplan may be outputted as the final floorplan.

In various examples, the present disclosure describes methods and systems that make use of a RL agent to predict a CBL action, to construct a floorplan for a desired circuit on a block-by-block basis. The disclosed methods and systems do not require the blocks to be placed according to a defined sequence and are not constrained to place the blocks according to a defined grid.

The use of CBL representation for the floorplan provides advantages for use with a RL agent. For example, the CBL representation has an inherent sequential nature that enables a RL agent to be trained to generate a sequence of actions to construct a floorplan. As well, because CBL representation enables the floorplan to be represented without explicitly defining the (x, y) coordinates of each block, the action space for the RL agent is smaller and thus training can be more efficient.

Examples of the present disclosure make use of a hypergraph GCN to encode information about the netlist graph. The use of a hypergraph GCN may be suitable because the connections represented in the netlist graph may be more readily represented using hyperedges than simple edges. The use of a hypergraph GCN may be suitable in various circuit design tasks, such as analog circuit design, macro placement, congestion prediction, etc.

The present disclosure also describes an example dot product technique to enable a discrete block ID value to be selected from a variable range, while keeping the action space the same for the policy network. Using the dot product technique may provide a relatively simple way to maintain the same number of parameters for the policy network even as the number of blocks changes. The dot product technique may be less complex to implement than a KNN-based technique, and thus may provide savings in terms of memory resources and processor power. The dot product technique disclosed herein may be adapted for other RL tasks. For example, the dot product technique disclosed herein may be useful in any transfer learning using RL, in which a predicted action in a continuous space is to be mapped to a discrete action value.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a floorplan for a circuit, the method comprising:
obtaining a netlist graph of the circuit and a set of block features associated with blocks of the circuit;
using a reinforcement learning (RL) agent to generate a sequence of corner block list (CBL) actions, each CBL action representing a block placement action and being generated by:
generating, from the netlist graph, the set of block features and a current CBL representation of the floorplan, a current state embedding representing a current state of the floorplan; and
inputting the current state embedding to a policy network of the RL agent to generate a predicted output vector, the predicted output vector from the policy network being used to generate the CBL action;
wherein after each CBL action is generated the current CBL representation of the floorplan is updated with the generated CBL action and the set of block features is updated to reflect the state of the floorplan after applying the generated CBL action; and
outputting the current CBL representation as a final floorplan after all blocks of the circuit have been placed by the sequence of CBL actions.

2. The method of claim 1, wherein generating the current state embedding comprises:
encoding the netlist graph and the set of block features into a graph embedding using a neural network;
encoding the current CBL representation using a lookup table into a CBL embedding; and
combining the graph embedding and the CBL embedding to generate the current state embedding.

3. The method of claim 2, wherein encoding the netlist graph and the set of block features into the graph embedding comprises:
encoding the netlist graph and the set of block features into node embeddings using a hypergraph graph convolutional network (GCN); and
pooling the node embeddings into the graph embedding.

4. The method of claim 1, wherein each generated CBL action comprises a block identifier (ID) value, an insertion direction value, and a T-junction value.

5. The method of claim 4, wherein each generated CBL action further comprises a rotation value or an aspect ratio value.

6. The method of claim 4, wherein the netlist graph and the set of block features are encoded into node embeddings and the node embeddings are pooled into the graph embedding, and wherein the predicted output vector from the policy network is used to determine the block ID value of the CBL action by:
computing a dot product of the predicted output and the node embeddings to obtain a probability vector; and
determining the block ID value to correspond to an index of a highest probability value in the probability vector.

7. The method of claim 1, further comprising:
computing a reward of the final floorplan;
updating parameters of the RL agent including parameters of the policy network using the computed reward; and
performing at least another iteration using the RL agent to output another final floorplan;
wherein the iterations are repeated until a termination condition is met.

8. The method of claim 1, further comprising:
after each CBL action is generated, determining whether the generated CBL action is invalid; and
in response to an invalid CBL action, generating a penalty feedback to the RL agent.

9. A computing system comprising:
a memory storing instructions; and
a processing unit coupled to the memory, the processing unit being configured to execute the instructions to cause the computing system to:
  obtain a netlist graph of a circuit and a set of block features associated with blocks of the circuit;
  use a reinforcement learning (RL) agent to generate a sequence of corner block list (CBL) actions, each CBL action representing a block placement action and being generated by:
    generating, from the netlist graph, the set of block features and a current CBL representation of a floorplan, a current state embedding representing a current state of the floorplan; and
    inputting the current state embedding to a policy network of the RL agent to generate a predicted output vector, the predicted output vector from the policy network being used to generate the CBL action;
    wherein after each CBL action is generated the current CBL representation of the floorplan is updated with the generated CBL action and the set of block features is updated to reflect the state of the floorplan after applying the generated CBL action; and
  output the current CBL representation as a final floorplan after all blocks of the circuit have been placed by the sequence of CBL actions.

10. The computing system of claim 9, wherein the processing unit is further configured to execute the instructions to cause the computing system to generate the current state embedding by:
  encoding the netlist graph and the set of block features into a graph embedding using a neural network;
  encoding the current CBL representation using a lookup table into a CBL embedding; and
  combining the graph embedding and the CBL embedding to generate the current state embedding.

11. The computing system of claim 10, wherein the processing unit is further configured to execute the instructions to cause the computing system to encode the netlist graph and the set of block features into the graph embedding by:
  encoding the netlist graph and the set of block features into node embeddings using a hypergraph graph convolutional network (GCN); and
  pooling the node embeddings into the graph embedding.

12. The computing system of claim 9, wherein each generated CBL action comprises a block identifier (ID) value, an insertion direction value, and a T-junction value.

13. The computing system of claim 12, wherein each generated CBL action further comprises a rotation value or an aspect ratio value.

14. The computing system of claim 12, wherein the netlist graph and the set of block features are encoded into node embeddings and the node embeddings are pooled into the graph embedding, and wherein the predicted output vector from the policy network is used to determine the block ID value of the CBL action by:
  computing a dot product of the predicted output and the node embeddings to obtain a probability vector; and
  determining the block ID value to correspond to an index of a highest probability value in the probability vector.

15. The computing system of claim 9, wherein the processing unit is further configured to execute the instructions to cause the computing system to:
  compute a reward of the final floorplan;
  update parameters of the RL agent including parameters of the policy network using the computed reward; and
  perform at least another iteration using the RL agent to output another final floorplan;
  wherein the iterations are repeated until a termination condition is met.

16. The computing system of claim 9, wherein the processing unit is further configured to execute the instructions to cause the computing system to:
  after each CBL action is generated, determine whether the generated CBL action is invalid; and
  in response to an invalid CBL action, generate a penalty feedback to the RL agent.

17. A non-transitory computer readable medium having instructions encoded thereon, wherein the instructions, when executed by a processing unit of a computing system, cause the computing system to:
  obtain a netlist graph of a circuit and a set of block features associated with blocks of the circuit;
  use a reinforcement learning (RL) agent to generate a sequence of corner block list (CBL) actions, each CBL action representing a block placement action and being generated by:
    generating, from the netlist graph, the set of block features and a current CBL representation of a floorplan, a current state embedding representing a current state of the floorplan; and
    inputting the current state embedding to a policy network of the RL agent to generate a predicted output vector, the predicted output vector from the policy network being used to generate the CBL action;
    wherein after each CBL action is generated the current CBL representation of the floorplan is updated with the generated CBL action and the set of block features is updated to reflect the state of the floorplan after applying the generated CBL action; and
  output the current CBL representation as a final floorplan after all blocks of the circuit have been placed by the sequence of CBL actions.

18. The non-transitory computer readable medium of claim 17, wherein the instructions, when executed by the processing unit, further cause the computing system to generate the current state embedding by:
  encoding the netlist graph and the set of block features into a graph embedding using a neural network;
  encoding the current CBL representation using a lookup table into a CBL embedding; and
  combining the graph embedding and the CBL embedding to generate the current state embedding.

19. The non-transitory computer readable medium of claim 18, wherein the instructions, when executed by the processing unit, further cause the computing system to encode the netlist graph and the set of block features into the graph embedding by:
  encoding the netlist graph and the set of block features into node embeddings using a hypergraph graph convolutional network (GCN); and
  pooling the node embeddings into the graph embedding.

20. The non-transitory computer readable medium of claim 17, wherein the instructions, when executed by the processing unit, further cause the computing system to:
  compute a reward of the final floorplan;
  update parameters of the RL agent including parameters of the policy network using the computed reward; and
  perform at least another iteration using the RL agent to output another final floorplan;
  wherein the iterations are repeated until a termination condition is met.

* * * * *